Patented Nov. 2, 1937

2,097,895

UNITED STATES PATENT OFFICE 2,097,895

MANUFACTURE OF ARTIFICIAL RESINS AND THE LIKE

Edmund Charles Rossiter, London, England, assignor, by mesne assignments, to American Cyanamid Company, a corporation of Maine No Drawing. Application October 10, 1928, Serial No. 311,704. Renewed January 31, 1936. In Great Britain December 23, 1927

2 Claims. (Cl. 260—3)

This invention relates to the manufacture of artificial resins and the like and of moulding compositions, varnishes and other products therefrom.

According to one feature of the invention new artificial resins are manufactured by reacting upon formaldehyde with dicyandiamide.

I have found that formaldehyde and dicyandiamide react to form a series of resinous compounds similar to those obtained from urea and/or thiourea and formaldehye and the reaction occurs under similar conditions.

In the case of dicyandiamide, resinous compounds are produced with one, two or three molecules of formaldehyde, all of which have useful properties, particularly in the manufacture of moulded articles; for they are clear colourless resins capable of being hardened under heat and pressure and they may be mixed with fillers to form moulding powders in known manner.

According to a further feature of the invention, new or improved resins are produced by admixing a reaction product of dicyandiamide and formaldehyde with a condensation product of urea and/or a derivative or substitution product thereof with formaldehyde. For example, a thiourea-urea-formaldehyde condensation product or resin may be modified or improved by the incorporation of a reaction product of dicyandiamide and formaldehyde. Likewise condensation products or resins of urea alone and formaldehyde or of thiourea alone and formaldehyde may be improved or modified. The known resins or intermediate products thereof, may, for instance, be modified by the addition of a dicyandiamide formaldehyde reaction product so that their behaviour under heat and pressure may be advantageously adjusted, or that their flowing properties are increased, and that generally they are rendered more easy to handle when subjected to heat and pressure. In referring to these products, I use the term "a urea" to cover urea and the substituted ureas such as thiourea and the like.

I do not limit myself to making the mixture by mixing the dicyandiamide formaldehyde reaction product previously made with other resins: the dicyandiamide itself may be mixed with urea or thiourea, or a mixture of thiourea and urea or with phenol or other compounds capable of condensing with formaldehyde and this mixture reacted with formaldehyde to produce the mixture of resins.

According to a further feature of the invention the condensation products of dicyandiamide and formaldehyde are caused to react with acids to yield an extensive series of artificial resins or the like i. e. resinous, gummy, wax-like and oily compounds. The term "acid" as here used and as used in the claims is intended to embrace acid salts and other compounds having an affinity for bases. For example, organic hydroxy compounds such as phenols may be used. Casein and like compounds may also be employed.

This reaction is not limited to compounds produced from specific proportions of dicyandiamide and formaldehyde.

For example, when dicyandiamide (one molecular proportion) is dissolved in an aqueous solution of formaldehyde (two molecular proportions) and the solution is treated with an acid such as formic acid, a small quantity of carbon dioxide is evolved. If the acid is added in small successive quantities, the mixture gradually reverts to the neutral after each addition until approximately one molecular proportion of acid to one molecular proportion of dicyandiamide has been added; after that a further addition of acid renders the mixture permanently acid. If, however, butyric acid is employed in place of formic acid the neutral point is reached when about ½ molecular proportion of butyric acid is added; further addition renders the mixture permanently acid.

It is not necessary to add the whole of the one molecular proportion of acid in order to obtain useful products. In fact, by adjusting the proportion of acid, the properties of the product may be widely varied, which is of extreme commercial importance in the application of these products.

In accordance with this invention products of very varying properties are obtained by utilizing the above type of reaction. For instance, employing an acid of the fatty acid series, such as formic acid, the compound produced is a clear colourless substance which swells up in water like gelatine, and finally dissolves and is miscible with gelatine in all proportions; it is also miscible with the resins produced from urea and/or thiourea and formaldehyde and imparts to these products highly adhesive properties.

The compound produced with a large proportion of butyric acid is not hardened by heat and may be heated for hours at 140°–160° C. and remains clear and soluble in water. This compound when mixed with the primary condensation product of urea and formaldehyde gives a mixture which can be evaporated with ease to yield a colourless glass perfectly free from bubbles and insoluble in water; moreover it can be mixed with triphenyl phosphate and other of the well-known plasticizers and still yield a perfectly transparent glass.

The compounds obtained with oleic, linoleic and ricinoleic acids are insoluble in water, but easily soluble in benzene and similar solvents; they are miscible with rubber, yield valuable varnishes and are miscible with the resins produced from urea and/or thiourea and phenols and formaldehyde and thereby afford valuable plasticizers for these resins.

Another series of compounds with valuable properties is formed with dibasic acids, e. g. oxalic acid, and a further series with sulphonic acids, e. g. sulphanilic and naphthalene sulphonic acids, etc.

The reaction can apparently be applied to all acids; that is, the resin-forming compounds produced by the action of formaldehyde on dicyandiamide are capable of combining with acids and acid compounds generally to form further products which according to the nature of the acids used are resins, wax-like or oily compounds, many of which are of value. The nature of the products will also vary according to the proportions of formaldehyde and dicyandiamide employed.

It will be understood that the process of the invention may be carried out in many cases by adding the acid to the formaldehyde and dicyandiamide before the reaction between the two last mentioned compounds has been effected. Likewise any of the compounds employed can be brought into the reaction in the nascent state. In the latter case, when a mixed resin is being produced, the product may be different from that obtained by mixing the previously formed resins.

The reaction which takes place when dicyandiamide is reacted with formaldehyde is not sufficiently known to be explained with certainty by a formula equation; it is however probable that combination takes place in a similar manner to that which takes place in the case of urea and formaldehyde.

When however the condensation products of formaldehyde and dicyandiamide are treated with acids hydrolysis to a greater or less degree takes place with formation of guanyl urea derivatives and sometimes a further small hydrolysis to guanidine derivatives: this latter reaction usually to the extent that from 1–8% of guanyl urea derivative is converted into a guanidine derivative.

The following are typical examples of the method of preparation and the properties of the new products the parts being by weight.

The dicyandiamide and formaldehyde condensation products are prepared as follows:—

*Example 1*

34.5 parts of dicyandiamide (being 15% excess of the quantity required for the ratio of 1 molecule dicyandiamide to 2 molecules formaldehyde) are dissolved in 57.5 parts of formalin containing 21.4 parts of formaldehyde and the solution heated on the water bath at 60°–80° C. for three hours. A clear solution is obtained which on cooling may become slightly turbid. When this solution is evaporated on the water bath a clear resin is obtained which on cooling becomes more or less opaque and brittle: it is not soluble in water but soluble in ethylene glycol and softens at about 100° C. It mixes completely with the resins produced from formaldehyde and urea, thiourea and mixtures of thiourea and urea and with other artificial resins. When moistened with ethylene glycol and heated a clear product is obtained which after several hours heating at 80°–85° C. yields a clear transparent product of a consistency resembling camphor.

When mixed with the urea-formaldehyde resin or the urea-thiourea-formaldehyde resin and heated for several hours at 80°–85° C. clear transparent products are obtained; and by adjusting the proportions in which the resins are mixed products are obtained varying considerably in hardness, flexibility and softening point.

Very similar resins are obtained when using 1 molecule dicyandiamide to 1 molecule or to 2 molecules formaldehyde.

In order to produce moulding powders from these resins we may for example proceed as follows: —

*Example 2*

10 parts of dicyandiamide are dissolved in 10 parts of formalin containing 3.57 parts of formaldehyde and the solution heated on the water bath at 60°–80° C. for a few hours: the solution is then used to impregnate a filler such as disintegrated paper pulp or wood meal using about 50–60 parts of the resin to 50–40 parts of filler, the mixture is dried at 70°–80° C. and ground and moulded in the well-known manner under heat and pressure.

*Example 3*

In a similar manner solutions of resin are obtained from 10 parts of dicyandiamide and 7.14 parts of formaldehyde and from 10 parts of dicyandiamide and 10.7 parts of formaldehyde. These moulding powders are characterized by having a very good flow and by the ease with which they part from the mould. They are slow in curing and require about 10 minutes at 120° C. These properties of good flow combined with the ease with which they part from the mould are useful when the above resins are mixed with urea-formaldehyde resin or the thio-urea-formaldehyde resin or the resin obtained from a mixture of urea and thiourea.

For example

*Example 4*

20 parts of urea, 20 parts of dicyandiamide are dissolved in 90 parts of formalin containing 34.2 parts of formaldehyde and the solution heated for 3 hours on the water bath. This solution, which contains about 74 parts of resin constituents which is assumed to be the quantity of resin or of the first condensation product of the reaction, is used to impregnate 61 parts of wood meal and the mixture dried and ground in the usual manner: a moulding powder is obtained which has a very good flow, parts easily from the mould and cures in about 5 minutes at 120° C.

*Example 5*

If the ratio of urea to dicyandiamide is altered by taking 37.5 parts of urea, 2.5 parts of dicyandiamide and 38 parts of formaldehyde a slightly turbid solution is obtained. When this is used to make a moulding powder in the manner described above, a moulding powder is obtained which has good flow, parts easily from the mould and cures in 1–2 minutes at 120° C.

The products obtained by the action of acids on the condensation products of dicyandiamide and formaldehyde may also be used to modify and improve the moulding properties of other resins.

For example a useful moulding powder is produced as follows:—

Example 6

100 parts of urea and 10 parts dicyandiamide are dissolved in 290 parts of formalin containing 107 parts formaldehyde and after heating for a short time on the water bath 10 parts of butyric acid are added and heating continued. A gelatinous mass is obtained which is mixed with wood meal or other filler, dried and ground in the usual manner.

Example 7

100 parts of urea are dissolved in 270 parts of formalin and to the solution the previously prepared dicyandiamide-formaldehyde-butyric acid resin in solution is added, and the mixture heated on the water bath. In this case a clear syrupy solution is obtained which is used to impregnate the filler and converted into moulding powder in the usual way.

The preparation and properties of the condensation products obtained by combining acids with the condensation products of dicyandiamide and formaldehyde may be illustrated by the following examples:—

Example 8

To prepare the resins containing sulphuric acid:

20 parts of dicyandiamide are dissolved in 40 parts of formalin containing 14.3 parts of formaldehyde and the solution heated on the water bath for 1–2 hours. 11.6 parts of sulphuric acid diluted with 20 parts of water are then added. A vigorous evolution of gas ($CO_2$) takes place and after 1–2 hours heating the solution commences to gelatinize. When this solution is evaporated on the water bath a tough gelatinous product is obtained. After heating 18 hours at 80° C. a white brittle resin is obtained, which softens and dissolves slightly in boiling water, giving an acid solution: it is insoluble in alcohol. When half the above proportion of sulphuric acid is employed, a very similar product is obtained, which when boiled with water is slightly soluble and gives a neutral or faintly acid solution.

With hydrochloric acid very similar products are formed.

Example 9

To prepare the resins containing formic acid:

30 parts of dicyandiamide are dissolved in 58 parts of formalin containing 21.5 parts of formaldehyde and the solution heated on the water bath and 12.6 parts of formic acid are added; after some hours heating a clear transparent jelly is obtained which is soluble in water. When heated at 80°–90° C. for several hours a clear brittle resin is obtained which swells up like gelatine in water and then dissolves. It mixes with gelatine in all proportions. When resins are prepared with less formic acid the solubility in water decreases as less formic acid is used.

Example 10

A resin solution having very pronounced adhesive properties is obtained by mixing the aqueous solutions of 84 parts of urea-thiourea-formaldehyde resin with 16 parts of dicyandiamide-formaldehyde resin adding 1.3 parts of formic acid and evaporating on the water bath until the mixture contains about 20% of water.

Example 11

A product from butyric acid may be prepared as follows:—

40 parts of dicyandiamide are dissolved in 77.4 parts of formalin containing 28.6 parts of formaldehyde and 40 parts of butyric acid added and the mixture heated on the water bath for several hours. A clear very viscid syrup is obtained. It is soluble in water, on evaporation it gives a clear brittle resin and after heating to 160° C. remains clear and soluble in water.

The resin mixes with the resins made from formaldehyde and urea, thiourea and mixtures of these resins. It also mixes with the resins obtained by the action of the higher fatty acids (i. e. linoleic acid) on the condensation products of dicyandiamide and formaldehyde, etc. and some of these mixtures may be mixed with triphenyl phosphate and other well known plasticizers. By these means mixtures of resin are obtained of wide application i. e. flexible and stretchable transparent sheets are easily produced and the solution of the resins yields a very pliable varnish.

A mixture of urea-formaldehyde resin containing from 20–30% of the butyric acid compound when evaporated in a thin layer yields a colourless transparent sheet, the pliability of which can be adjusted by the addition of triphenylphosphate. The same mixture makes a good colourless varnish when mixed with the corresponding condensation product from ricinoleic acid and dissolved in butyl alcohol together with a small quantity of ethylene glycol and triphenyl phosphate and the solution finally diluted with alcohol.

The product from citric acid may be prepared in a similar manner. The solution obtained is a clear syrup when warm and an opaque white rubber-like mass when cold. When dried at 80° C. it yields a transparent resin. It is slightly soluble in water, soluble in ethylene glycol, insoluble in benzene and sextol, soluble in an aqueous solution of dicyandiamide and mixes with the resins obtained from formaldehyde and urea and/or thiourea.

The product from glycerophosphoric acid is obtained as a colourless syrupy solution which on evaporation gives a brittle glass-like product; it is insoluble in alcohol and sextol, soluble in water, ethylene glycol and in solutions of the resin made from thiourea and formaldehyde.

The product from sulphanilic acid is a clear hard product which softens on heating; it is difficult to dissolve in any solvent after it has been separated from the aqueous solution in which it is first obtained, but it is soluble in hot ethylene glycol and in aqueous and alcoholic solutions of the resin made from thiourea and formaldehyde.

When the corresponding compounds obtained from the higher fatty acids are prepared, they are found to be eminently suitable for use in the manufacture of varnish.

Example 12

A product from linoleic acid is prepared as follows:—

200 parts of dicyandiamide are dissolved in 580 parts of formalin containing 214 parts of formaldehyde and 666 parts of linoleic acid are added, the mixture is heated at 90°–95° C. for 4½ hours in an aluminum vessel and continuously stirred; it is then evaporated at 100° C. until the product weighs slightly less than the combined weight of the constituent substances; a soft pale yellow resin is obtained which hardens on exposure to the air. It is soluble in benzene etc., and sextol, sparingly soluble in alcohol, ethylene glycol, turpentine, sextone, sextate, amyl alcohol, cymene and China-wood oil. It yields a pale yellow varnish when 30 parts are dissolved in 8 parts of sextol and 62 parts of a mixture of equal volumes of benzene and alcohol. This solution can be mixed with copal, ester gum, nitro cellulose, etc. and especially with rubber.

By mixing the resin with rubber latex which can be done in all proportions, a uniform product is obtained which can be dissolved in benzene, etc. to give a solution containing up to 20% by weight of rubber.

In a similar manner a resin can be prepared from stearic acid which is useful as a varnish constituent and as a plasticizer; it is prepared as follows:—

Example 13

12 parts of dicyandiamide are dissolved in 36 parts of formalin containing 13.3 parts formaldehyde and 28 parts of stearic acid added: the mixture is heated under reflux for 5 hours when an emulsion is formed which is slowly converted into a semi-solid wax-like mass. The product when dried is of the nature of a white wax: it is soluble in benzene, etc., sextol and turpentine and slightly soluble in water. When dissolved in a mixture of benzene, alcohol, sextol and turpentine, it gives a colourless varnish which dries fairly quickly at 70–80° C. and in 24 hours when exposed at ordinary temperature.

Example 14

A compound with oleic acid may be prepared as follows:—

20 parts of dicyandiamide are dissolved in 58 parts of formalin containing 21.5 parts of formaldehyde and 62 parts of oleic acid added. The mixture is continuously stirred and heated to about 100° C.; gas is given off and a thick emulsion is obtained which after evaporation to dryness yields a soft wax-like product. It is insoluble in water, but will dissolve in the aqueous solution of the condensation product from urea, thiourea and formaldehyde when the latter is mixed with sextol. It is soluble in diethylene glycol, cymene, benzene, the monoethyl ether and the monomethyl ether of ethylene glycol and sextone. It is insoluble in water, alcohol and acetone, and very slightly soluble in amyl alcohol. When this product is heated at 80°–90° C. for 48 hours it loses about 12% in weight and becomes hard and somewhat brittle; it now softens at 120° C. but does not melt at 140° C. and is only slightly soluble in benzene.

Example 15

A compound with ricinoleic acid may be prepared as follows:—

20 parts of dicyandiamide are dissolved in 58 parts of formalin containing 21.5 parts of formaldehyde and 30 parts of ricinoleic acid added. The mixture is heated as described above and evaporated to dryness. The product is a clear soft resin. It is insoluble in water and benzene, soluble in alcohol, hot ethylene glycol and in a mixture of sextol and benzene.

Another compound with ricinoleic acid may be prepared by using 70 parts of ricinoleic acid; this product after drying is a clear yellow and very viscid oil. It is soluble in benzene, alcohol, sextol and castor oil; it is sparingly soluble in acetone and ethylene glycol. It mixes with rubber. When heated for 30 hours at 120° C. it loses about 14% in weight and is still slightly soft. It does not harden or only extremely slowly when exposed to the air: it mixes with other artificial resins.

Example 16

A compound with oxalic acid may be prepared as follows:—

20 parts of dicyandiamide are dissolved in 59 parts of formalin containing 21.5 parts of formaldehyde and an aqueous solution of 15 parts of oxalic acid is added; a very brisk evolution of gas takes place which is found to be a mixture of carbon monoxide and dioxide; after about 3 hours heating on the water bath, most of the resin separates in white curds and finally a white brittle resin is obtained.

Example 17

A compound with camphoric acid may be prepared as follows:—

20 parts of dicyandiamide are dissolved in 39 parts of formalin containing 14.3 parts of formaldehyde and 23 parts of camphoric acid added. The mixture is heated in the water bath and continuously stirred; a brisk evolution of gas takes place; a white solid is gradually produced and after about 3–4 hours heating, an almost solid mass is obtained, which is dried. It is insoluble in water, alcohol, butyl alcohol, sextol, turpentine, benzene, and the monoethyl ether of ethylene glycol.

It is soluble in ethylene glycol and in a solution of dicyandiamide in formalin and in the aqueous solution of the condensation product of urea, thiourea and formaldehyde; when these solutions are evaporated the resins are obtained clear; it does not harden on heating at 120° C.

Example 18

If only 12 parts of camphoric acid are used in the preceding example a clear solution is obtained which on further heating gives a white solid and finally a clear syrup which is alkaline to methyl red. On evaporation a soft white wax is obtained. It is insoluble in water, alcohol and butyl alcohol, soluble in ethylene glycol and acetic acid.

Examples of these new resins in combination with phenol formaldehyde resins are as follows:—

Example 19

20 parts of dicyandiamide, 10 parts of phenol, 21 parts of formaldehyde in 56 parts of formalin and 15 parts of butyric acid are mixed and heated on the water bath; a brisk evolution of gas takes place; the mixture is then heated under reflux for about 2 hours; a clear pale yellow solution is obtained which after evaporation yields a soft and tough clear yellow resin; it is nearly completely soluble in boiling water and separates as a white powder on cooling; it is soluble in a mixture of water and alcohol, very soluble in ethylene glycol, and this solution mixes with alcohol, water, butyl alcohol or a mixture of benzene and alcohol. The solution in ethylene glycol when evaporated and the resin heated at 120° C. gives a clear yellow glass which slightly softens when boiled in water but is otherwise unaltered.

Example 20

20 parts of dicyandiamide, 10 parts of phenol, 21 parts of formaldehyde in 56 parts of formalin and 30 parts of ricinoleic acid are mixed and heated under reflux, gas is given off, an emulsion is formed and in about 2 hours the resin is precipitated as a pale yellow oil which on cooling forms a clear buttery product.

It is soluble in hot ethylene glycol but separates on cooling and soluble in alcohol, butyl alcohol, amyl alcohol, "Sextol", "Sextone" and carbon tetrachloride, etc., insoluble in amyl acetate and benzene. Heated at 120° C. it hardens to a clear glass-like product.

*Example 21*

This is an example of the employment of phenol as an "acid".

The resin obtained by the condensation of 1 mol. of dicyandiamide, 2 mols. formaldehyde when heated with an equal weight of phenol at 100°–120° C. for 2 hours gives a clear pale yellow and soft resin. It is easily soluble in ethylene glycol and the solution can be diluted with alcohol, a mixture of alcohol and benzene, acetone or amyl acetate. It is insoluble in alcohol, butyl alcohol, benzene, acetone and amyl acetate. When heated at 100°–110° C. it hardens slowly and is converted into a transparent glass-like resin.

It must be clearly understood that the above examples are only a few of the products which may be prepared by the use of this type of condensation. These compounds will vary in properties according to the proportion of constituents employed and also with the same proportions of constituents they will vary according to the manner in which the condensation is effected. That is, if the condensation of the dicyandiamide and formaldehyde is completed or nearly completed before adding the acid, a product is obtained which may have different properties from that obtained by mixing all the constituents together and then effecting the condensation. This difference is very marked when a mixture of resins is being made one of which is very sensitive to the action of acids, for example, the resin obtained from urea and formaldehyde.

I claim:—

1. A resinous reaction product of formaldehyde, dicyandiamide and linoleic acid.

2. A resinous reaction product of formaldehyde, dicyandiamide, and an organic acid selected from a group consisting of oleic acid, stearic acid, linoleic acid, ricinoleic acid, butyric acid, camphoric acid, sulfanilic acid and naphthalene sulphonic acid.

EDMUND CHARLES ROSSITER.